United States Patent Office 3,551,381
Patented Dec. 29, 1970

3,551,381
SATURATED LINEAR POLYESTERS THERMALLY STABILIZED WITH AMINES
Mary J. Stewart, Riddlewood, Media, and Otto K. Carlson, Marcus Hook, Pa., assignors to FMC Corporation, Philadelphia, Pa., a corporation of Delaware
No Drawing. Filed Jan. 17, 1968, Ser. No. 698,393
Int. Cl. C08g 51/60
U.S. Cl. 260—45.9
9 Claims

ABSTRACT OF THE DISCLOSURE

A thermal stabilized polyester composition comprising a saturated linear polyester and a thermal stabilizer selected from the group consisting of secondary and tertiary aliphatic, aromatic, or mixed aliphatic-aromatic amines.

---

This invention relates to highly polymeric saturated linear polyester resins that possess improved thermal stability and to a method of producing same.

Saturated linear polyester resins can be prepared by first carrying out a condensation reaction between a suitable dicarboxylic acid or ester thereof with a diol to form a prepolymer. The resulting prepolymer is then polycondensed to form the desired polyester resin. When an ester of a dicarboxylic acid is used as the starting material, it is first reacted with a diol in the presence of a tranesterification or ester-interchange catalyst by means of an ester-interchange reaction; whereas when a dicarboxylic acid is used as the starting material, it is first subjected to a direct esterification reaction with a diol in the presence of what is generally called a first stage additive or ether inhibitor. In either instance, the resulting reaction product, which may be generally described as a polyester prepolymer, is then polycondensed in the presence of a polycondensation catalyst to form a polyester resin.

For example, in the case of the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Saturated linear polyester resins, such as polyethylene terephthalate and many others, are widely used in the production of films and fibers and the like. However, it is generally known that such polyester products degrade when exposed to heat for a substantial period of time. Such degradation is particularly a problem in the extrusion and spinning processes of the finished resins to form the above-denoted products. Additionally, the fibers produced from such resins are extensively used in the textile field and, as a result of this application, are subjected to rather extreme temperatures in the processes of washing, drying, and ironing. Therefore, it is highly desirable that the polyester resin composition possess as much stability at high temperatures as possible.

Therefore, it is an object of the present invention to prepare a highly polymeric saturated linear polyester resin composition which exhibits improved thermal stability.

Another object of the present invention is to provide a method of preparing saturated linear polyester resin exhibiting such a high degree of thermal stability.

These and other objects are accomplished in accordance with the present invention with a stabilized polyester composition comprising a saturated linear polyester containing a minor amount of a thermal stabilizer selected from the group consisting of secondary and tertiary aliphatic, aromatic, or mixed aliphatic-aromatic amines, and physical mixtures thereof. It has been found preferable that the aromatic constituents thereof be phenyl or benzyl radicals and the aliphatic constituents thereof be alkyl radicals containing from 4 to 18 carbon atoms.

Among the secondary and tertiary amine compounds which can be used as thermal stabilizers in the present polyester compositions are, for example, didodecylamine, tri-n-hexylamine, triamylamine, triisoamylamine, diheptylamine, dipentadecylamine, diphenylamine, triphenylamine, phenylbenzylamine, diphenylheptylamine, N-didodecylaniline, N-dioctylaniline, N-dihexylaniline, dioctylbenzylamine, and dipentadecyclphenylamine.

The saturated linear polyester resins used in the preparation of the subject thermal stabilized polyester compositions can be prepared via the conventional ester-interchange reaction or by the direct esterification method.

The ester-interchange reaction is generally carried out with a molar ratio of diol, such as ethylene glycol to an ester of a dicarboxylic acid, such as dimethyl terephthalate of from about 1:1 to about 15:1, respectively, but preferably from about 1.2:1 to about 2.6:1. The transesterification or ester-interchange reaction is generally carried out at atmospheric pressure in an inert atmosphere such as nitrogen, initially at a temperature ranging from about 125–250° C., but preferably between about 150° C. and 200° C. in the presence of a suitable transesterification catalyst. For example, the transesterification catalyst used may be lithium hydride or zinc acetate at a concentration ranging from about 0.01% to about 0.20%, based on the weight of the ester of the dicarboxylic acid used in the initial reaction mixture. During the first stage of this reaction, methyl alcohol is evolved and is continuously removed by distillation. After a reaction period of about 1–2 hours, the temperature of the reaction mixture is raised to from about 200° C. to about 300° C. for approximately 1–3 hours in order to complete the reaction, so as to form the desired polyester prepolymer and to distill any excess glycol.

In the case of the direct esterification method of preparing saturated linear polyester resins, the reaction is generally carried out with a molar ratio of diol, for example, ethylene glycol, with a dicarboxylic acid, such as terephthalic acid, of from about 1:1 to about 15:1, but preferably from about 1.2:1 to about 2.6:1. The direct esterification step is generally carried out at temperatures ranging from about 180–280° C. in the absence of an oxygen containing atmosphere at atmospheric or elevated pressure for about 2–4 hours to form the desired polyester prepolymer. For example, the reaction may be carried out in an atmosphere of nitrogen.

The first stage of the direct esterification method is generally carried out in the presence of a suitable additive or buffer, such as triethylamine, at a concentration ranging from about $5 \times 10^{-5}$ mole to about $5 \times 10^{-1}$ mole of additive per mole of dicarboxylic acid in the initial reaction mixture.

Conventionally, the polycondensation step in the preparation of the subject polyester resins by either the transesterification method or direct esterification method is generally accomplished by adding a suitable polycondensation catalyst to the polyester prepolymer and heating the blend thereof under reduced pressure of from about 0.5 to 20 mm. of mecury while being agitated at a temperature of from about 260–325° C. for from 2–4 hours. For example, the polycondensation catalysts suitable for use are antimony trioxide and antimony sec-butoxide, at concentrations ranging from about 0.01% to about 0.2%, based on the weight of the polyester prepolymer to be polycondensed.

In the practice of the present invention, it has been found that it is prefered to mix or blend the present thermal stabilizers into the molten polyester resin immediately after the polycondensation step has been completed.

It has been found that the above-described thermal stabilizers are effective as such in polyester resin compositions when employed in amounts ranging from about 0.01% to about 0.5%, based on the weight of the polyester resin. Usually, it has been found that concentrations ranging from about 0.02% to about 0.3% are preferred in most instances. However, when indicated, concentrations less or greater than the above can be used, but their effectiveness is generally reduced.

The following examples of several preferred embodiments will further serve to illustrate the present invention, although it will be understood that these examples are included merely for the purpose of illustration and are not intended to limit the scope of the present invention. All parts are by weight, unless otherwise indicated.

EXAMPLE I

A blended mixture comprising 474 g. of terephthalic acid, 288 mls. of ethylene glycol and 149 mls. of triethylamnie was charged into a reaction vessel equipped with a nitrogen inlet, a Dean-Stark separating apparatus, heating means and stirring means. The reaction mixture was agitated and the temperature was raised to about 197° C. under a nitrogen blanket at atmospheric pressure. At about 190° C., a water triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then, the temperature was allowed to rise to about 230° C. over a one hour period to remove all the triethylamine and any excess glycol. The prepolymer product was allowed to cool under an atmosphere of nitrogen.

EXAMPLE II

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the polyester prepolymer and formation of a polyester resin. The polyester resin formed had an original intrinsic viscosity of 0.88, a degraded intrinsic viscosity of 0.69, and the percentage broken bonds was calculated as 0.132.

EXAMPLE III

Fifty grams of the prepolymer product of Example I was mixed with 0.02 g. of antimony sec-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. After the polycondensation reaction had been completed, 0.02 g. of didodecylamine was thoroughly stirred into the polyester resin while still molten at atmospheric pressure, after which the resin product was cooled. The resulting polyester resin composition had an original intrinsic viscosity of 0.63, a degraded intrinsic viscosity of 0.58, and the percentage broken bonds was calculated as 0.060.

EXAMPLE IV

Fifty grams of the prepolymer product of Example I was mixed with 0.02 g. of antimony sec.-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. After the polycondensation reaction had been completed, 0.02 g. of diphenylamine was thoroughly stirred into the polyester resin while still molten at atmospheric pressure, after which the resin product was cooled. The resulting polyester resin composition had an original intrinsic viscosity of 0.65, a degraded intrinsic viscosity of 0.59, and the percentage broken bonds was calculated as 0.067.

EXAMPLE V

Fifty grams of the prepolymer product of Example I was mixed with 0.02 g. of antimony sec.-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. After the polycondensation reaction had been completed, 0.02 g. of triphenylamine was thoroughly stirred into the polyester resin while still molten at atmospheric pressure, after which the resin product was cooled. The resulting polyester resin composition had an original intrinsic viscosity of 0.67, a degraded intrinsic viscosity of 0.58, and the percentage broken bonds was calculated as 0.092.

EXAMPLE VI

Fifty grams of the prepolymer product of Example I was mixed with 0.02 g. of antimony sec.-butoxide and placed in a reaction vessel. The reaction mixture was heated at about 280° C. under reduced pressure of from about 0.05 to about 0.1 mm. of mercury while under agitation for about 2 hours to bring about the polycondensation of the prepolymer and formation of a polyester resin. After the polycondensation reaction had been completed, 0.02 cc. of tri-n-hexylamine was thoroughly stirred into the polyester resin while still molten at atmospheric pressure, after which the resin product was cooled. The resulting polyester resin composition had an original intrinsic viscosity of 0.71, a degraded intrinsic viscosity of 0.61 and the percentage broken bonds was calculated as 0.092.

EXAMPLE VII

A mixture comprising 600 g. of dimethyl terephthalate, 396 mls. of ethylene glycol, and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then, the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE VIII

Fifty grams of the prepolymer product of Example VII was mixed with 0.02 g. of antimony trioxide and placed in a reaction vessel. The reaction mixture was heated at about 280° C. under reduced pressure of from about 0.05 to about 0.1 mm. of mercury while under agitation for about 3 hours to bring about the polycondensation of the polyester prepolymer and formation of a polyester resin. The polyester resin formed had an original intrinsic viscosity of 1.13, a degraded intrinsic viscosity of 0.76, and the percentage broken bonds was calculated as 0.169.

EXAMPLE IX

Fifty grams of the prepolymer product of Example VII was mixed with 0.02 g. of antimony trioxide and placed in a reaction vessel. The reaction vessel was heated at about 280° C. under reduced pressure of from about 0.05 to about 0.1 mm. of mercury while under agitation for about 3 hours to bring about the polycondensation of the polyester prepolymer. After the polycondensation reaction had been completed, 0.02 g. of didodecylamine was stirred into the polyester resin while still molten at atmospheric pressure, after which the resin product was cooled. The resulting polyester resin composition had an original intrinsic viscosity of 0.86, a degraded intrinsic viscosity of 0.68, and the percentage broken bonds was calculated at 0.122.

In the above examples, the original intrinsic viscosity values of the polyester resin products were obtained by measuring the intrinsic viscosities of the resin compositions as produced.

The degraded intrinsic viscosity values were determined by the following procedure: The polyester resin composition was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. ($\pm 0.5°$ C.). The block was then sealed and evacuated to 0.1 mm. of mercury. After holding for about 10–15 seconds, the block was filled with dried, oxygen-free nitrogen gas. This vacuum-nitrogen purge was then repeated for a total of three times; the entire process took 5–7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted in the examples above as the degraded intrinsic viscosity.

The percentage broken bonds values indicated in the above examples were calculated by the use of the following equation:

$$\text{Percent Broken Bonds} = \left[\left(\frac{K}{V_f}\right)^{1/a} - \left(\frac{K}{V_i}\right)^{1/a}\right] \times 9.6 \times 10^3$$

The value of $K$ and $a$ may be found in the literature, such as Conix, A., Makromol., Chemie 26, p. 226 (1958), wherein $K = 0.00021$ and $a = 0.82$. $V_f$ in the above formula is the degraded or final intrinsic viscosity value and $V_i$ is the original or initial intrinsic viscosity value.

All of the intrinsic viscosity determinations of the polyester resin products produced in the above examples were determined in a 60% phenol and 40% tetrachloroethane solution, wt./wt., at 30° C., according to conventional laboratory procedure.

The results in the above examples indicate that the present additives, when added to saturated linear polyester resins, act to stabilize or reduce the degradation effects of higher temperatures upon such polyester resins. The change in intrinsic viscosity or the difference between the original intrinsic viscosity and the degraded intrinsic viscosity is a direct measure of the heat stabilizing effect that the present thermal stabilizers have upon polyester resins and can be readily calculated from the above results.

When the controls above, Examples II and VIII, are compared with their corresponding examples wherein the same catalyst systems were used, with the addition of a thermal stabilizer of the present invention, it can readily be seen from the intrinsic viscosity values and the percentage broken bonds values that the present stabilizers act in all cases to limit the amount of degradation that takes place when polyester resin products are exposed to elevated temperatures for prolonged periods of time.

The present invention has been illustrated with particular respect to the stabilization of polyethylene terephthalate. However, the present thermal stabilizers are also effective in stabilizing any saturated linear polyesters and copolyesters; for example, those derived from dicarboxylic acids, such as isophthalic acid, and 4,4'-diphenyldicarboxylic acid, or ester derivatives thereof, and suitable diols, such as glycols of the series $HO(CH_2)_nOH$, where $n$ is 2 to 10.

It will be apparent that various different embodiments can be made practicing this invention without departing from the spirit and scope thereof, and therefore, it is not intended to be limited, except as indicated in the appended claims.

We claim:
1. A stabilized polyester composition comprising a saturated linear polyester resin having incorporated therein a minor amount of a thermal stabilizer selected from the group consisting of didodecylamine, tri-n-hexylamine, triamylamine, triisoamylamine, diheptylamine, dipentadecylamine, triphenylamine, phenylbenzylamine, diphenylheptylamine, N-didodecylaniline, N-dioctylaniline, N-dihexylaniline, dioctylbenzylamine, and dipentadecylphenylamine.
2. The composition of claim 1 wherein the polyester is polyethylene terephthalate.
3. The composition of claim 1 containing from about 0.01 to about 0.5% by weight of a thermal stabilizer.
4. The composition of claim 1 wherein the thermal stabilizer is didodecylamine.
5. The composition of claim 1 wherein the thermal stabilizer is diphenylamine.
6. The composition of claim 1 wherein the thermal stabilizer is tri-n-hexylamine.
7. The composition of claim 1 wherein the thermal stabilizer is triphenylamine.
8. The composition of claim 1 wherein the thermal stabilizer is phenylbenzylamine.
9. The composition of claim 1 wherein the thermal stabilizer is diphenylheptylamine.

References Cited
UNITED STATES PATENTS

| | | | |
|---|---|---|---|
| 2,996,477 | 8/1961 | Long et al. | 260—45.9 |
| 3,023,192 | 2/1962 | Shivers | 260—45.9 |
| 3,208,859 | 9/1965 | Coffield | 260—45.7 |
| 3,215,759 | 11/1965 | Milionis | 260—45.9 |
| 3,452,056 | 6/1969 | Sundholm | 260—45.9 |
| 2,543,329 | 2/1951 | Meyers | 260—45.9 |
| 2,550,139 | 4/1951 | Daly | 260—45.9 |
| 3,481,891 | 12/1969 | Boylan et al. | 260—45.9 |

HOSEA E. TAYLOR, Primary Examiner